(12) United States Patent
Dover

(10) Patent No.: US 6,609,195 B2
(45) Date of Patent: Aug. 19, 2003

(54) CONFIGURING INTEGRATED CIRCUIT DEVICES IN A DATA PROCESSING SYSTEM

(75) Inventor: Lance Dover, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/371,798

(22) Filed: Feb. 20, 2003

(65) Prior Publication Data

US 2003/0126422 A1 Jul. 3, 2003

Related U.S. Application Data

(63) Continuation of application No. 09/474,647, filed on Dec. 29, 1999, now Pat. No. 6,553,491.

(51) Int. Cl.[7] .................................................. G06F 9/44
(52) U.S. Cl. ....................................................... 713/100
(58) Field of Search ...................................... 713/1, 100

(56) References Cited

U.S. PATENT DOCUMENTS

| | | | | | |
|---|---|---|---|---|---|
| 6,028,445 | A | * | 2/2000 | Lawman | 326/38 |
| 6,085,317 | A | * | 7/2000 | Smith | 713/1 |
| 6,282,640 | B1 | * | 8/2001 | Klein | 713/1 |
| 6,430,687 | B1 | * | 8/2002 | Aguilar et al. | 713/2 |

* cited by examiner

Primary Examiner—Thomas M. Heckler
(74) Attorney, Agent, or Firm—Fish & Richardson, P.C.

(57) ABSTRACT

System information prompting a reconfiguration of a target device that is part of the system is received, and in response to the information, the target device is reconfigured using configuration data for the target device that has been stored in non-volatile memory of a second self-configuring device that is part of the system.

20 Claims, 3 Drawing Sheets

CONFIGURING INTEGRATED CIRCUIT DEVICES IN A DATA PROCESSING SYSTEM

CROSS REFERENCE TO RELATED APPLICATIONS

This application is a continuation (and claims the benefit of priority under 35 USC 120) of U.S. application Ser. No. 09/474,647, filed on Dec. 29, 1999 now U.S. Pat. No. 6,553,491; the disclosure of the prior application is considered part of (and is incorporated by reference in) the disclosure of this application.

TECHNICAL FIELD

This invention relates to configuring devices in a computer system.

BACKGROUND

Special purpose integrated circuit chips, for example, typically cannot perform their normal functions until they are configured, which is usually done when the computer system is powered up or reset. Configuration information is usually stored on the device itself in non-volatile memory. For so-called programmable logic devices (PLD's) and field programmable gate arrays (FPGA's), the configuration information may be stored in a non-volatile memory located off the device. By changing the configuration information, the functions of the PLD's and FPGA's may be changed.

In some computer systems, the chips that need to be configured are part of a chipset and a local channel is provided to enable communication between the chips in a way that does not directly use and is not disruptive of the operation of the main system bus. The local channel can be called a local bus.

Typically the chips within the computer system must be customized to particular tasks, that is, configured to function as desired. One expensive way to configure a chip is to alter the chip hardware during construction, using, for example, bond pads or pin straps.

In another approach, the configuration is done based on data sent to the chip (for example, a PLD or an FPGA) on the system bus, e.g., during a reset cycle. This approach has the advantage that the chip may be customized to a particular application without hardwiring. In self-configuring chips, the configuration instructions are kept in the chip's own non-volatile memory or non-volatile storage (NVS). Non-volatile storage is able to retain data in the absence of main power. There are many kinds of non-volatile memory, such as read-only memory (ROM), programmable read-only memory (PROM) and erasable programmable read-only memory (EPROM). Some types of battery-backed random-access memory (RAM) also may be considered to be non-volatile.

If a chip is not self-configuring, it receives its configuration instructions over a communications channel or bus from an external source. Configuration activity occurring on the bus may be referred to as the "configuration bus cycle.".

SUMMARY

In general, in one aspect, the invention features storing configuration data for a target device in non-volatile memory of a self-configuring device. The target device and the self-configuring device are a part of a data processing system. The invention further features receiving system information prompting a reconfiguration of the target device, and in response to the information, reconfiguring the target device using the configuration data.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Some implementations of the invention include groups of chips in a chipset, where at least one chip in the chipset has some form of non-volatile storage. In response to a reset signal, the chip with NVS configures itself and also supplies the configuration data to configure other chips in the chipset using a configuration bus cycle. The self-configuring chip may configure multiple chips in a chipset directly. The self-configuring chip may also configure another chip, which in turn may provide configuration data to another chip in the chipset. The configuration data are provided on a local bus, making the configuration process invisible to the system and the user.

Figure 1:
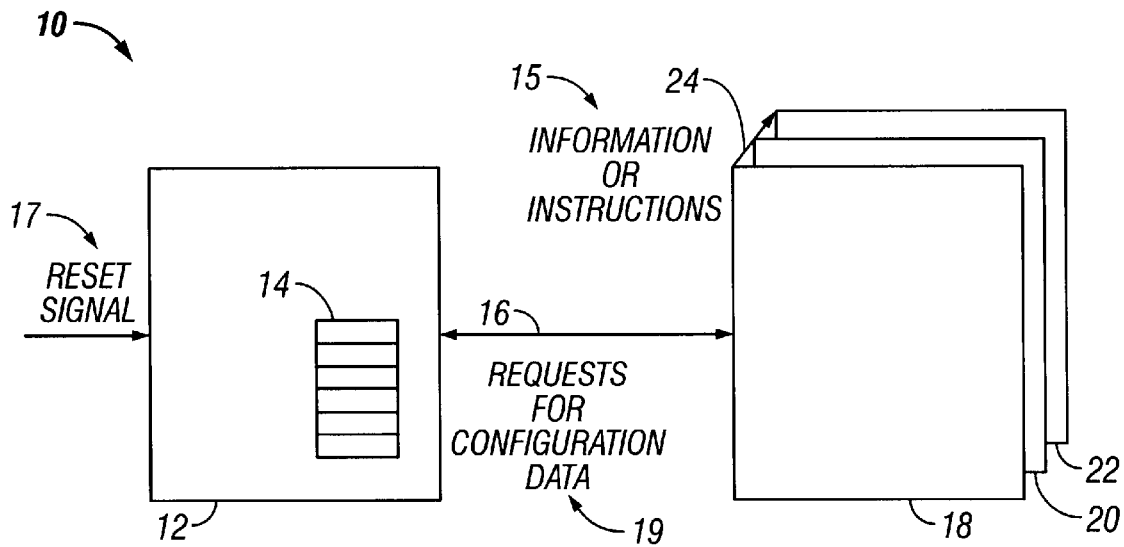
FIG. 1 block diagram of an implementation of the invention.

In one implementation, shown in FIG. 1, integrated circuit chips 12, 18, 20, 22 form part of a chipset 10. One chip 12 in the chipset has non-volatile storage 14, making it an NVS device. The NVS device 12 includes within its non-volatile memory 14 information or instructions 15 for configuring the NVS device 12 and other non-NVS devices 18, 20, 22 in the chipset 10. The information or instructions 15 within non-volatile memory 14 include configuration data for the chipset 10.

After receiving a reset signal 17 from the computer system (not shown), the NVS device 12 places configuration data on a local bus 16 connecting the NVS device 12 with the non-NVS devices 18, 20, 22 in the chipset 10. The NVS device 12 may also place configuration data on local bus 16 in response to requests for configuration data 19 placed upon the bus by the non-NVS devices 18, 20, 22. Configuration data may be sent by the NVS device 12 on local bus 16 directly to each non-NVS device 18, 20, 22 in turn. Or, configuration data may be sent by the NVS device 12 on local bus 16 to one of the non-NVS devices 18, which may in turn pass along configuration data to other non-NVS devices 20, 22 on a bus 24. Bus 24 may be the same communication channel as bus 16.

Figure 2:
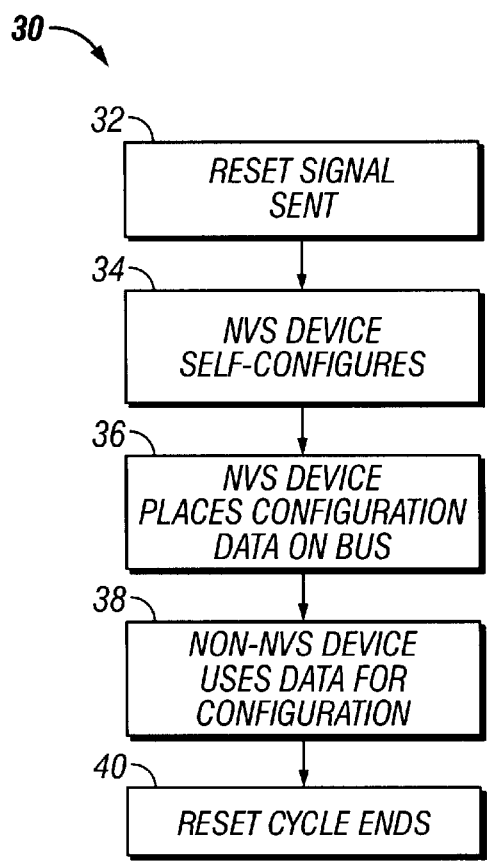
FIG. 2 is a flowchart showing steps in various implementations of the invention.

FIG. 2 shows a flowchart for a configuration bus cycle 30. The cycle begins when a reset signal is sent at 32 (e.g., in response to a system power-up or as commanded by a user). In response to the reset signal, the NVS device uses the configuration data stored within its non-volatile memory to self-configure at 34. The NVS device then places configuration data stored within its non-volatile memory on the bus at 36. And a non-NVS device uses this data for configuration at 38. Configuration of all devices is completed before the end of the reset cycle at 40.

Figure 3:
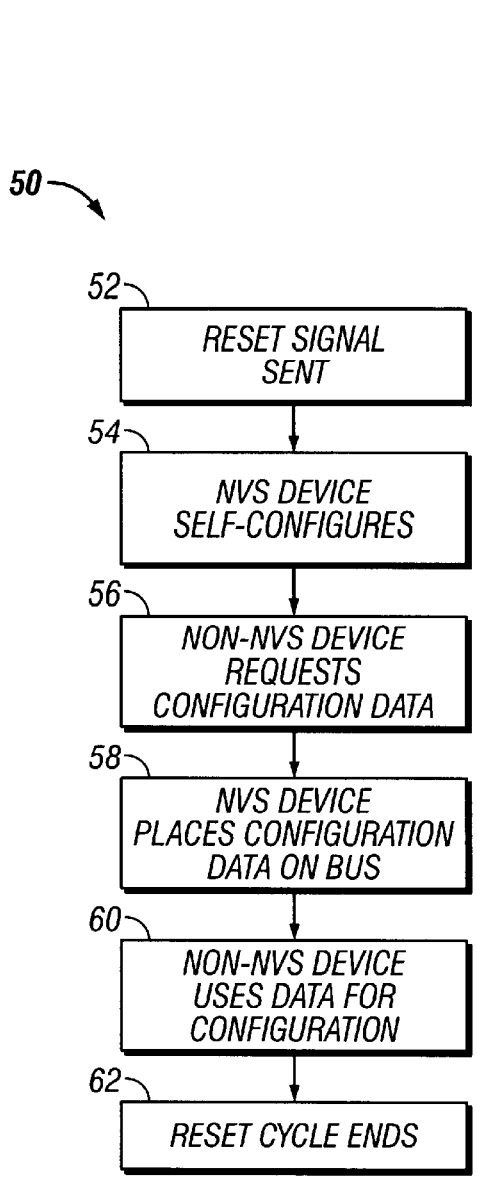
FIG. 3 is a flowchart showing steps in various implementations of the invention.

FIG. 3 shows a flowchart for another kind of configuration bus cycle 50. The cycle begins when a reset signal is sent at 52. In response to the reset signal, the NVS device uses the configuration data stored within its non-volatile memory to self-configure at 54. Also in response to the reset signal, the non-NVS device places a request for configuration data on the bus at 56. The NVS device responds by placing the configuration data on the bus at 58. The non-NVS device uses the configuration data for configuration at 60. Configuration of all devices is completed before the end of the reset cycle at 62.

Figure 4:
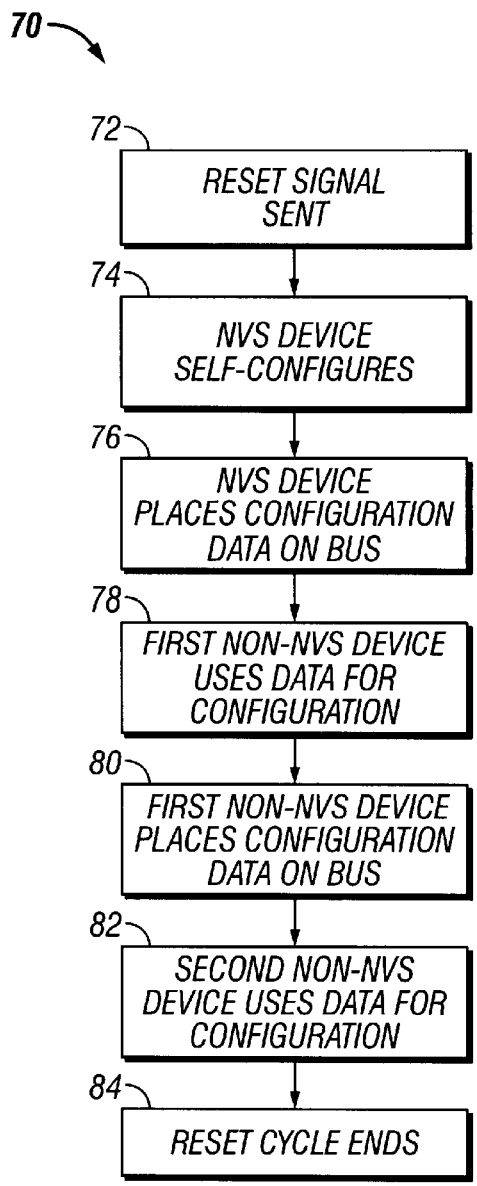
FIG. 4 is a flowchart showing steps in various implementations of the invention.

FIG. 4 shows a flowchart for another kind of configuration bus cycle. The cycle begins when a reset signal is sent at 72. In response to the reset signal, the NVS device uses the configuration data stored within its non-volatile memory to self-configure at 74. Also in response to the reset signal, the non-NVS device places a request for configuration data on the bus at 76. The first non-NVS device uses the data for configuration at 78. Then, the first non-NVS device places configuration data on the bus at 80. A second non-NVS device uses this data for configuration at 82. Configuration of all devices is completed before the end of the reset cycle at 84.

Figure 5:
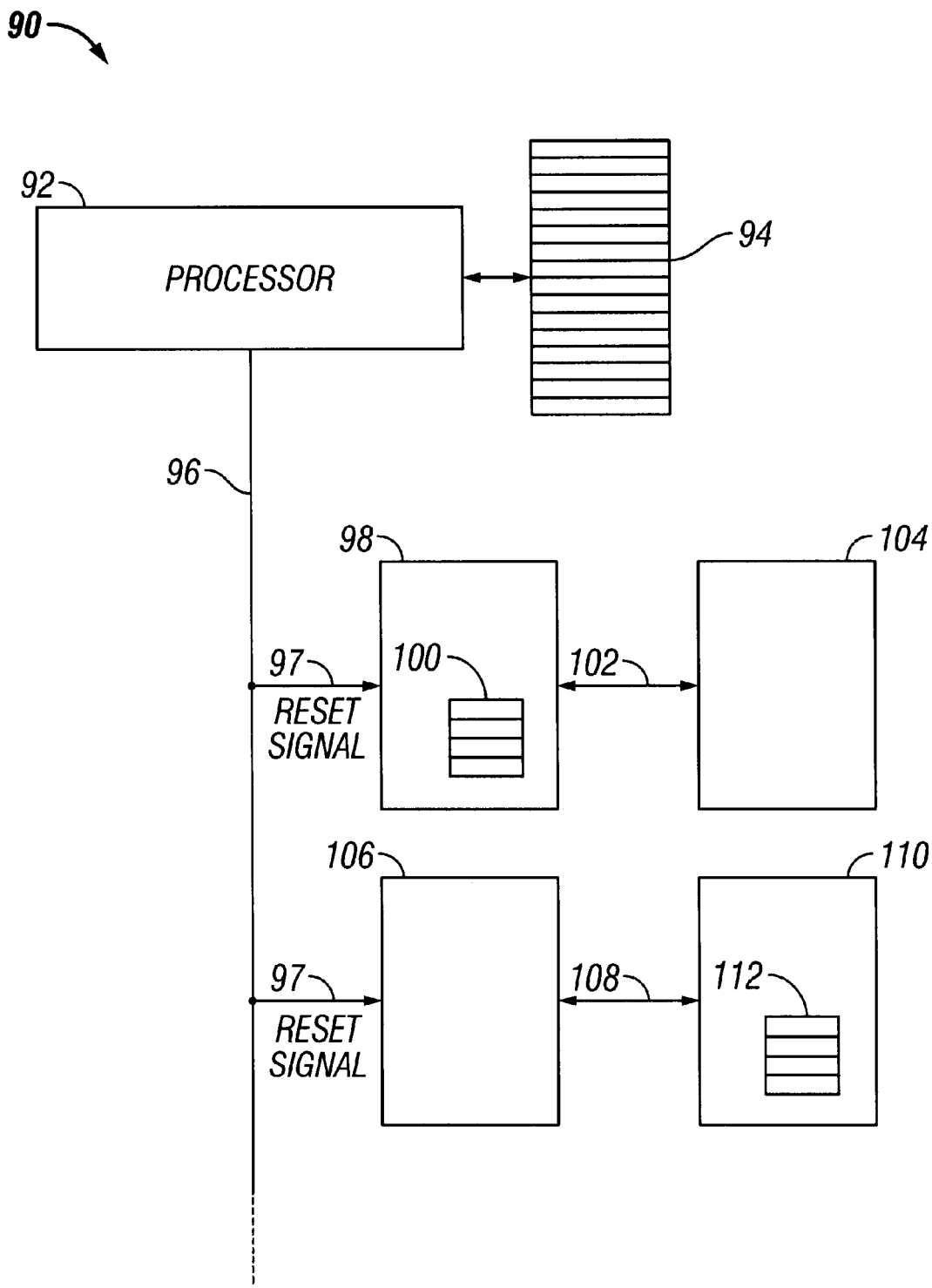
FIG. 5 is a block diagram of an implementation of the invention.

FIG. 5 shows the invention implemented within a computer system 90. The system has central processor 92, which is served by memory 94. A communication channel or main system bus 96 connects the processor to other devices 98, 106 in the system. One of the devices 98 is an NVS device with non-volatile memory 100, like chip 12 with non-volatile memory 14 in FIG. 1. NVS device 98 is connected to non-NVS device 104 by a local bus 102, like non-NVS device 18 is connected to NVS device 12 by a local bus 16 in FIG. 1. Communication along local bus 102 is non-system-level communication. After receiving a reset signal 97 from the processor 92, the NVS device 98 places configuration data on a local bus 102. FIG. 5 also shows a non-NVS device 106 receiving the reset signal 97 from the system bus 96. The non-NVS device 106 may request configuration information from a device 110 with non-volatile storage 112. The devices 106 and 110 communicate on a local bus 108.

Other embodiments are within the scope of the following claims.

What is claimed is:

1. An apparatus comprising:
    a configurable integrated circuit device that engages in a configuration communication cycle; and
    a self-configuring integrated circuit device that engages in the configuration communication cycle to provide configuration data that configures the configurable integrated circuit device.

2. The apparatus of claim 1, further comprising at least one additional configurable integrated circuit device that engages in the configuration communication cycle, wherein the configuration data configures the at least one additional configurable integrated circuit device.

3. The apparatus of claim 2, wherein the self-configuring integrated circuit device provides the configuration data directly to the configurable integrated circuit devices.

4. The apparatus of claim 2, wherein the configurable integrated circuit device provides the received configuration data to the at least one additional configurable integrated circuit device.

5. The apparatus of claim 1, further comprising a local channel, wherein the self-configuring integrated circuit device provides the configuration data to the configurable integrated circuit device using the local channel.

6. The apparatus of claim 1, wherein the self-configuring integrated circuit device includes a non-volatile memory storing the configuration data, and the configurable integrated circuit device lacks a non-volatile memory.

7. The apparatus of claim 1, wherein the self-configuring integrated circuit device and the configurable integrated circuit device comprise at least a portion of a multi-chip chipset used to orchestrate data flow in a data processing system.

8. The apparatus of claim 1, wherein the self-configuring integrated circuit device initiates the configuration communication cycle during a reset cycle.

9. The apparatus of claim 8, wherein the configuration communication cycle fully completes and the configurable integrated circuit device is configured during the reset cycle.

10. The apparatus of claim 1, wherein the configurable integrated circuit device initiates the configuration communication cycle.

11. A system comprising:
    a processor;
    a memory coupled with the processor;
    a configurable integrated circuit device;
    a channel coupled with the configurable integrated circuit device; and
    a self-configuring integrated circuit device that uses the channel to send configuration data that configures the configurable integrated circuit device.

12. The system of claim 11, further comprising at least one additional configurable integrated circuit device that engages in the configuration communication cycle, wherein the configuration data configures the at least one additional configurable integrated circuit device.

13. The system of claim 12, wherein the self-configuring integrated circuit device provides the configuration data directly to the configurable integrated circuit devices.

14. The system of claim 12, wherein the configurable integrated circuit device provides the received configuration data to the at least one additional configurable integrated circuit device.

15. The system of claim 12, wherein the self-configuring integrated circuit device includes a non-volatile memory storing the configuration data, and the configurable integrated circuit devices lack non-volatile memory.

16. The system of claim 11, wherein the channel comprises a local channel.

17. The system of claim 16, further comprising a basic input output system, wherein the self-configuring integrated circuit device and the configurable integrated circuit device comprise at least a portion of a multi-chip chipset used to orchestrate data flow among the memory, the processor and the basic input output system.

18. The system of claim 16, wherein the self-configuring integrated circuit device initiates the configuration communication cycle during a reset cycle.

19. The system of claim 18, wherein the configuration communication cycle fully completes and the configurable integrated circuit device is configured during the reset cycle.

20. The system of claim 16, wherein the configurable integrated circuit device initiates the configuration communication cycle.

* * * * *